July 3, 1962 V. J. PEZDEK ETAL 3,041,783
PLANT SUPPORTS
Filed April 6, 1959 4 Sheets-Sheet 1
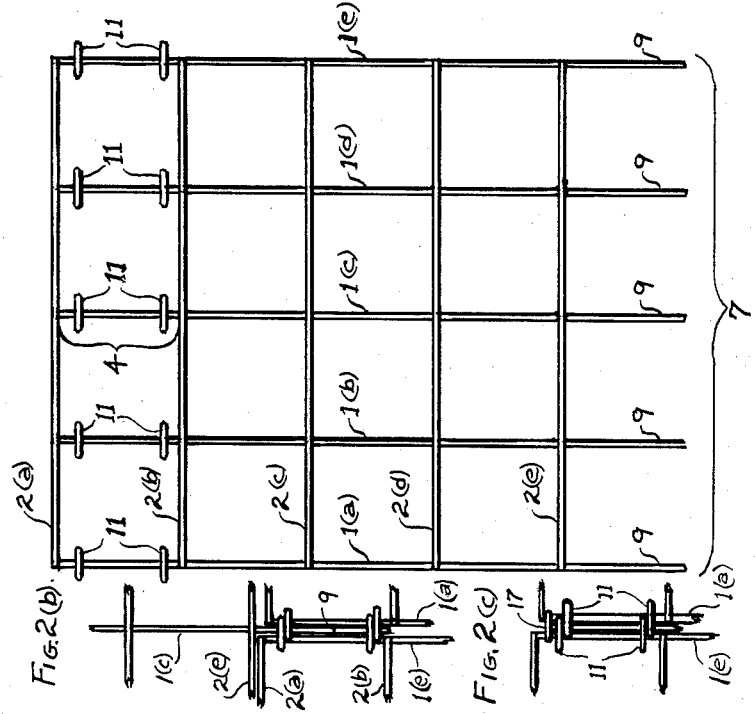
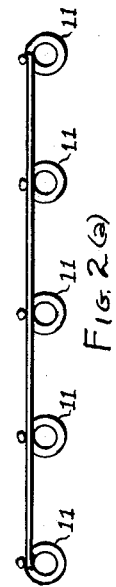
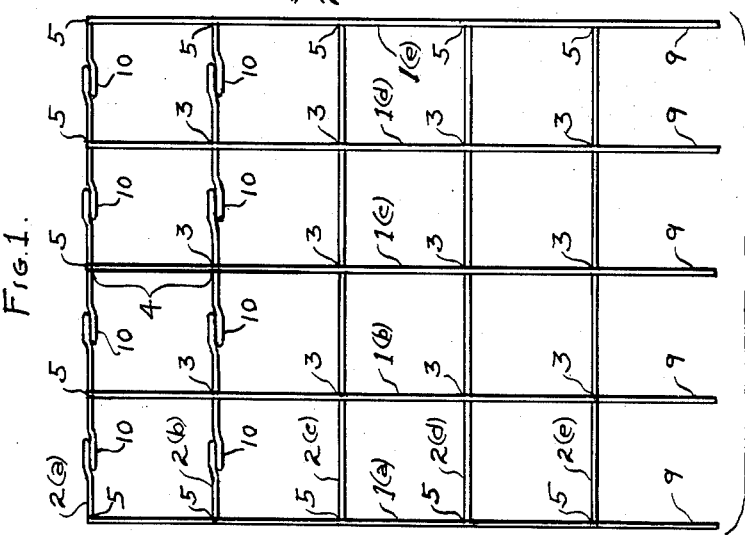
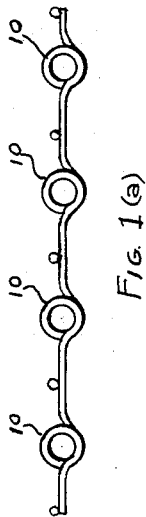
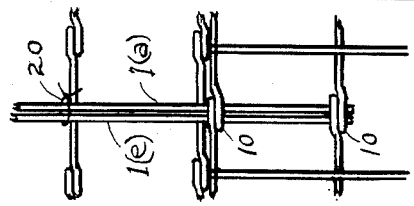
INVENTORS
Victor J. Pezdek
Lincoln E. Smith

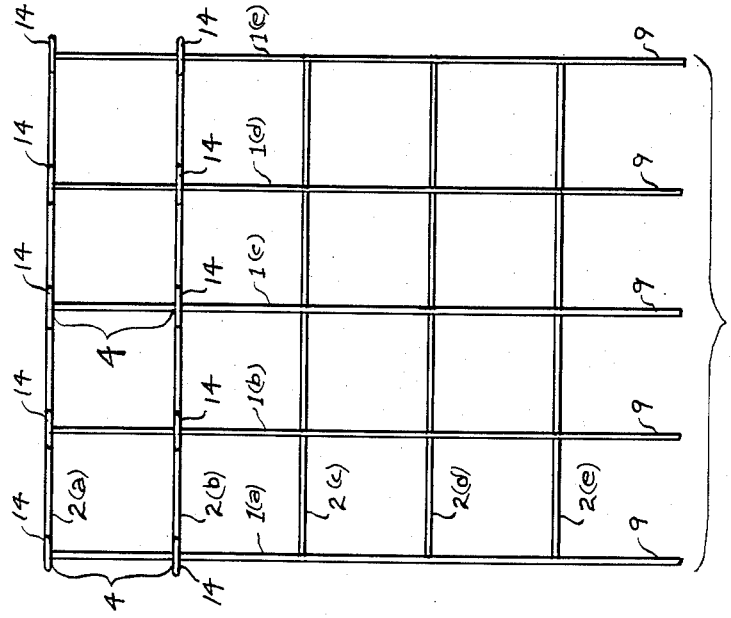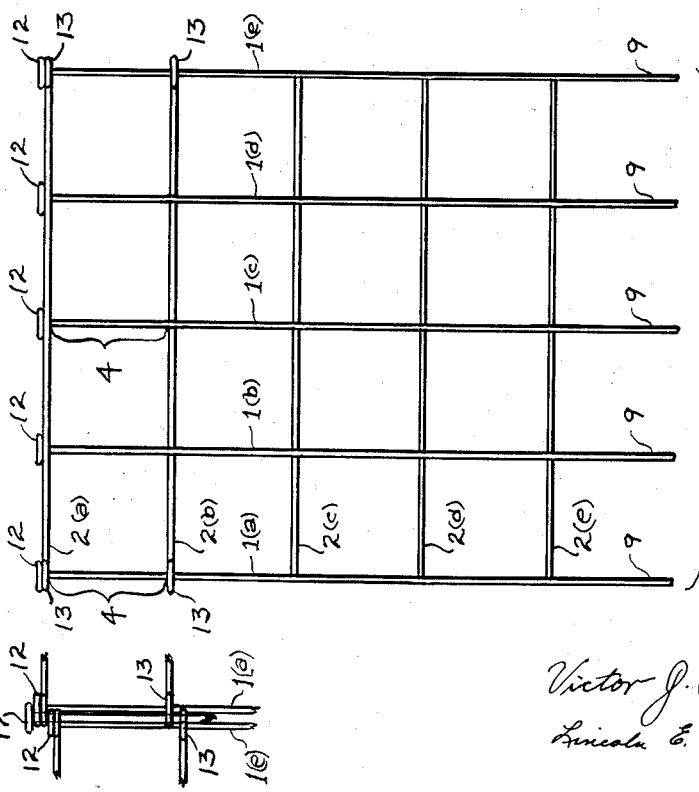

July 3, 1962 V. J. PEZDEK ETAL 3,041,783
PLANT SUPPORTS
Filed April 6, 1959 4 Sheets-Sheet 3
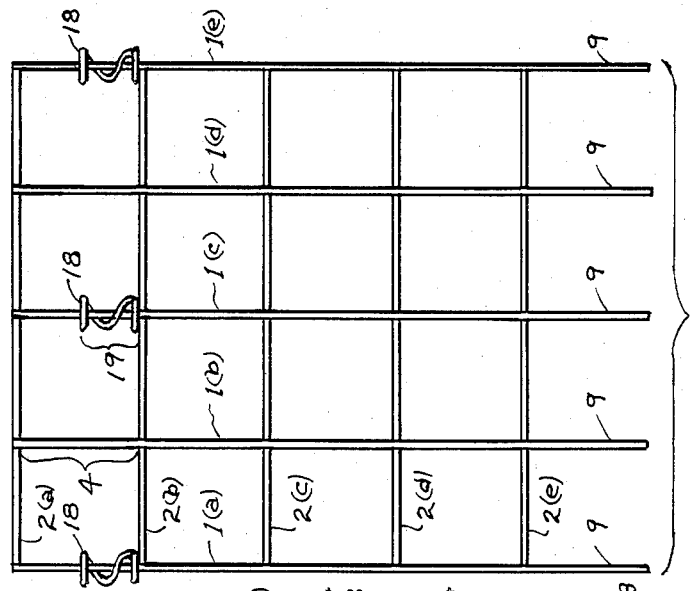
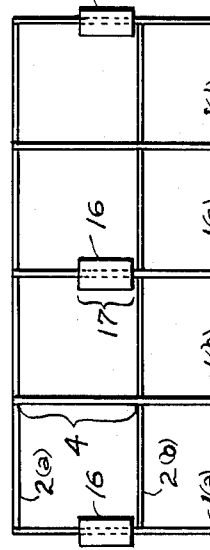
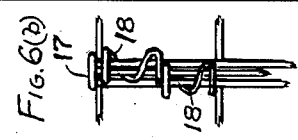
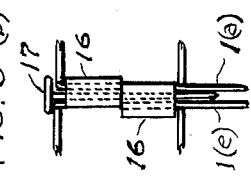
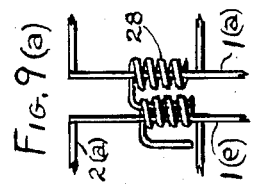
INVENTORS
Victor J. Pezdek
Lincoln E. Smith

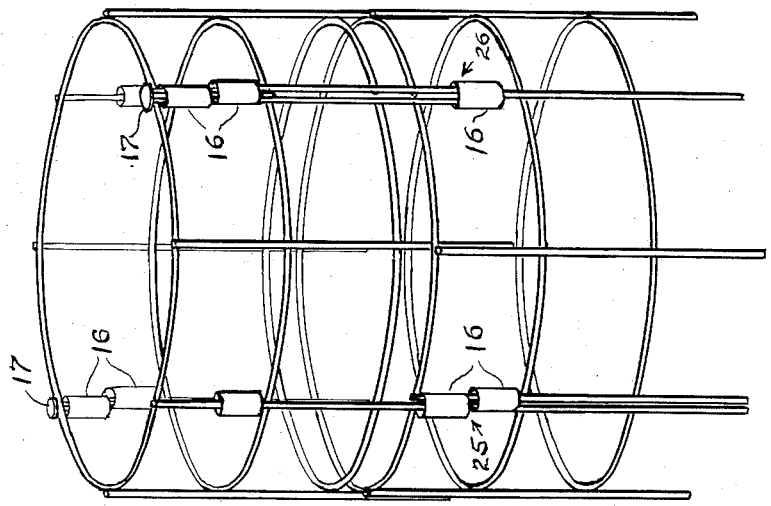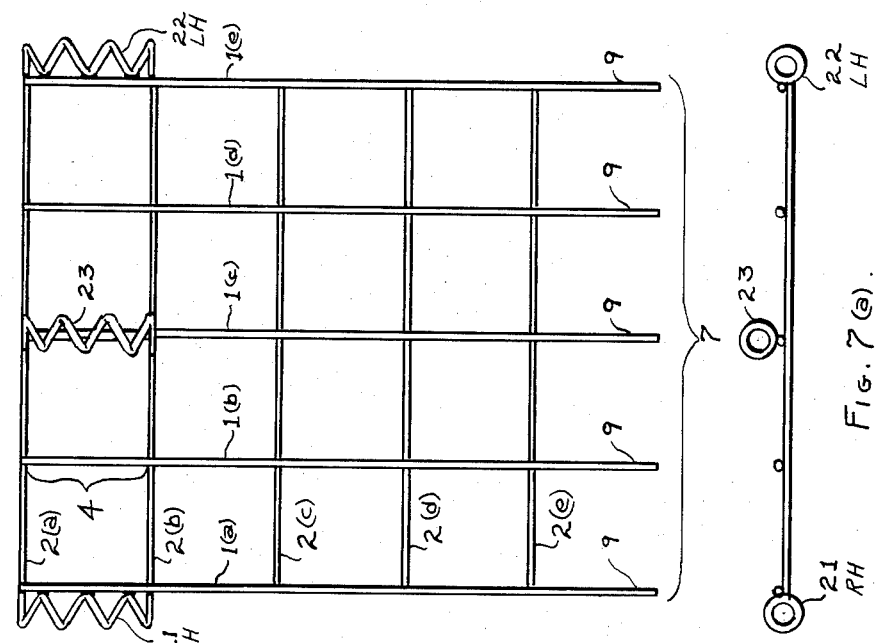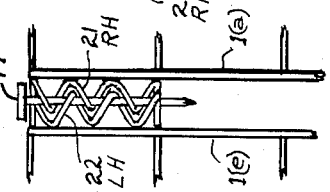

United States Patent Office 3,041,783
Patented July 3, 1962

3,041,783
PLANT SUPPORTS
Victor J. Pezdek, 613 8th St., Oakmont, Pa., and Lincoln E. Smith, 5424 Broad St., Pittsburgh 6, Pa.
Filed Apr. 6, 1959, Ser. No. 804,235
14 Claims. (Cl. 47—44)

This invention pertains to supporting devices for vines and other plants and in particular relates to a wire support for plants which support may be easily stored when not in use and which is made in interlocking unitary form so that larger units may easily be assembled from smaller modular units.

A common problem in the home garden as well as on the commercial truck farm is the supporting of fruit or vegetable vine plants such as tomatoes, beans, sweet peas, etc. so as to provide for maximum growth and/or productivity of such plants. Many types of flowering or other ornamental plants should also be supported above the ground to provide for their maximum growth and/or production. In addition, most growing plants require physical protection from animals and strong winds. Each of these specific needs is supplied by the device of this invention.

Various forms of trellises, arbors, poles, etc. have been proposed for this purpose, but all are subject to certain drawbacks. In the home garden the heretofore-available devices have been inflexible as to size, i.e. they have been either too large or too small as well as unsightly, and difficult to store in the winter months. In commercial truck farming the heretofore available devices have been expensive, time consuming and laborious to set up and take down, they occupy much valuable storage space when not in use, and they are not readily convertible in size and shape for use from one type of crop to another.

It is the purpose of this invention to provide a plant support that is inexpensive, easily stored, and readily set up in any desired size and in a variety of shapes as desired by the user. The invention encompasses a modular unitary support from which any size or shape plant support may be made as desired.

The invention comprises a relatively open-mesh rectangular net or grid having vertical and horizontal grid elements. The vertical elements protrude from the bottom edge of the grid, the protruding part lying in the plane of the grid thereby forming protuding legs. In that area of the grid opposite to that from which the protruding legs extend, certain of the grid elements are provided with receptacles which are made so that the axis of the hole through the receptacle is parallel to the protruding legs of the grid. The receptacles serve as means for laterally and/or vertically joining the grid units. The grid is appropriately dimensioned so that it becomes a modular unit from which any size or shape plant support assembly may be built up. The purpose of the protruding legs along one edge of the unit is two fold in that the legs may be stuck into the ground to provide firm support for the lower units of an assembly, and furthermore for vertically extending an assembly the legs of the upper modular units fit into receptacles of the underlying units thereby providing a firm support for the upper units and at the same time coupling together the adjacent underlying units. The grid may if desired be bent into the shape of a semi-cylindrical surface whose axis is parallel to the legs. Horizontal extension in a cylindrical, prismatic, serpentine, or other geometrical shape is accomplished by laterally coupling successive grid units. For horizontal extension adjacent units are coupled by keying together contiguous receptacles by insertion of a common nail through the receptacles to be coupled. Vertical extension is accomplished by inserting the legs of the superposed unit into the receptacles of the underlying unit. The insertion of the legs of the upper unit into the receptacles of the underlying units at the same time serves to couple together horizontally adjacent units of the lower row. The receptacles by means of which the units of the various embodiments of this invention are coupled together comprise loops, series of loops, rings, helixes, or cylinders as will be described later. No special tools, fasteners, hooks, or the like are required to make a support of any horizontal or vertical size or shape out of the modular units of the invention. Furthermore, the modular units of this invention are inexpensive to manufacture, they store substantially flat thus occupying minimum space during storage, shipping, or when not in use; and they are set up with a minimum expenditure of time and labor.

In the accompanying drawings forming part of this specification

FIGURES 1 and 1(a) illustrate respectively in elevation and top view one embodiment of this invention and FIGURE 1(b) illustrates one way of assembling the modular units of FIGURE 1;

FIGURES 2 and 2(a) illustrate respectively in elevation and top view a second embodiment of this invention and FIGURES 2(b) and 2(c) illustrate one way of assembling the modular units of FIGURE 2;

FIGURES 3 and 3(a) illustrate respectively in elevation and top view a third embodiment of this invention and FIGURE 3(b) illustrates one way of assembling the modular units of FIGURE 3;

FIGURES 4 and 4(a) illustrate respectively in elevation and top view a fourth embodiment of this invention, the modular units of FIGURE 4 being assembled in a manner similar to that illustrated in FIGURES 2(b) and 3(b);

FIGURES 5 and 5(a) illustrate respectively in elevation and top view a fifth embodiment of this invention, and FIGURE 5(b) illustrates one way of assembling the modular units of FIGURE 5;

FIGURES 6 and 6(a) illustrate respectively in elevation and top view a sixth embodiment of this invention, and FIGURE 6(b) illustrates one way of assembling the modular units of FIGURE 6;

FIGURES 7 and 7(a) illustrate respectively in elevation and top view a seventh embodiment of this invention, and FIGURE 7(b) illustrates one way of assembling the modular units of FIGURE 7;

FIGURE 8 illustrates an example of the manner in which any of the modular units of this invetnion may be assembled to form a cylindrical plant support of any desired height and diameter, and FIGURE 9 illustrates an alternative form of the receptacle employed in the embodiment of FIGURE 6, and FIGURE 9(a) illustrates one way of coupling laterally adjacent receptacles of the form shown in FIGURE 9.

Referring to FIGURE 1, the invention comprises a net or grid of relatively open-mesh with vertical elements 1(a), 1(b), 1(c), 1(d), and 1(e) running in the vertical direction, and with horizontal elements 2(a), 2(b), 2(c), 2(d), and 2(e) running in the horizontal direction. The respective elements terminate at the intersections 5 with a boundary element 1(a), 1(e), 2(a), except along the lower edge 7 at which the vertical elements 1(a), 1(b), 1(c), 1(d) and 1(e) extend beyond the last intersecting horizontal element 2(e) to form legs 9. The grid elements are conveniently made of metal wire. The vertical wires 1(a), 1(b), 1(c), 1(d), and 1(e) are rigidly joined to the horizontal wires 2(a), 2(b), 2(c), 2(d), and 2(e) at their intersections (such as 3 and 5) as by welding, twisting, looping, etc. in well known manner as is customary in making wire mesh or wire fencing.

In the figures, five wires are shown running in each direction, but the number of horizontal wires and the number of vertical wires may be varied as desired and need not be the same. The grid spacing 4 is shown to be the same in the vertical and the horizontal directions, but the grid spacing may be varied as desired. The diameter of wire employed in the grid and the vertical and horizontal spacing of the wires will depend on the type of plant to be supported. We have found that for fruiting plants the grid spacing should be large enough to permit entrance of the hand through the grid and withdrawal of the hand and the fruit. By way of example, for supporting tomato plants we prefer to use iron wires of size about No. 10 A.W.G. and an equal vertical and horizontal grid spacing of about six inches. For lighter vegetables and for flowers such as beans, sweet peas, etc. a lighter gauge wire may be employed and the grid spacing may be varied accordingly as desired. The wires may be of rust-resisting metal such as aluminum, or may be iron wires galvanized, plastic coated and colored if desired, or otherwise treated in well known manner to prevent rusting or to produce ornamental effects.

In the drawings the diameter of the grid wires is greatly enlarged for clarity of illustration. In all of the embodiments of this invention the grid itself is substantially of the form illustrated in FIGURE 1 and its description will not be repeated in describing each of the further embodiments of the invention.

In the embodiment of FIGURE 1, the uppermost two horizontal wires 2(a) and 2(b) each have between their intersections with vertical wires a receptacle in the form of a loop 10 rigidly attached thereto. The loops are conveniently made as a continuation of the wires 2(a) and 2(b). The axis of the hole in each loop 10 is substantially parallel to the legs 9, i.e. parallel to vertical wires 1(a), 1(b), 1(c), 1(d), and 1(e). While the other horizontal wires 2(c), 2(d), and 2(e) are shown without such loops, they may also have loops similar to the loops 10 of wires 2(a) and 2(b) if desired. The loops 10 in the wires 2(a) and 2(b) are in vertical alignment as shown in FIGURE 1. It is preferred that the vertical wires 1(a), 1(b), 1(c), 1(d), and 1(e) be equidistantly spaced and the loops 10 in the horizontal wires 2(a) and 2(b) are spaced the same distance. This permits offsetting the overlying and underlying units in vertical assembly as illustrated in FIGURES 1(b) and 8 so as to provide a firm structure.

FIGURE 2 shows another embodiment of the invention in which the receptacles are in the form of loops 11 located on the vertical grid elements. In the embodiment of FIGURE 2, the loops 11 are made in the vertical wires 1(a), 1(b), 1(c), 1(d), and 1(e). At least one loop is made in the vertical wires between intersections with the uppermost two horizontal wires 2(a) and 2(b), but it is preferred that each of the vertical wires have two loops 11 between the intersections with the two uppermost horizontal wires as illustrated in FIGURE 2. Similar loops may be made in the vertical wires intermediate their intersections with the other horizontal wires if desired. The axes of the holes in the loops 11 are substantially parallel to the vertical wires 1(a), 1(b), 1(c), 1(d), and 1(e) and legs 9. FIGURE 2(c) illustrates how the units may be coupled together by means of a common nail 17, and FIGURE 2(b) illustrates how the units are coupled together by means of the leg 9 of an overlying unit.

FIGURE 3 shows another embodiment of the invention in which the receptacles are in the form of loops 12 and 13 formed from the ends of the grid elements at three edges of the grid in the region bounded by the two uppermost horizontal grid elements. The upper ends of the vertical wires 1(a), 1(b), 1(c), 1(d), and 1(e) terminate in a loop 12. The horizontal wires 2(a) and 2(b) terminate at both ends in a loop 13. The other horizontal wires 2(c), 2(d), and 2(e) may also have loops similar to 13 at their ends if desired. The axes of loops 12 and 13 are parallel to the vertical wires 1(a), 1(b), 1(c), 1(d), 1(e) and legs 9 as in the embodiment of FIGURES 1 and 2. FIGURE 3(b) illustrates how the units may be coupled together by means of a common nail 17.

In another embodiment of the invention illustrated in FIGURE 4, the receptacles in the form of loops 14 are located at all of the intersections of the two uppermost horizontal wires 2(a) and 2(b) with vertical wires 1(a), 1(b), 1(c), 1(d), and 1(e). The axes of the loops 14 are parallel to the vertical wires and legs 9 as in the embodiments of FIGURES 1, 2, and 3. The loops 14 may be formed either in the vertical wires or in the horizontal wires, or both. Similar loops may be located at intersections of the grid wires other than those shown if desired.

The loops 10, 11, 12, 13, and 14 have a hole of diameter somewhat greater than twice and preferably about three times the diameter of the vertical wires, since under certain conditions of use it is desirable to be able to insert two or more wires into the same loop. It is sometimes convenient to key two loops together with a common nail and the loops therefore should have a hole that is larger in diameter than the diameter of the nail to be employed but smaller than the head of the nail. By way of example, the hole in loops 10, 11, 12, 13, and 14 have a diameter of about $3/16''$. In the drawings the loops are shown greatly enlarged for clarity of illustration. The figures show the loops 10, 11, 12, 13, and 14 to be formed of a single turn of wire, but it is apparent that two or more turns may be used in forming the loop. It is further apparent that the loops may be formed by a continuation of the grid wire or may be formed of small rings attached to the grid wire in proper orientation as by welding, soldering, etc. The loops 10, 11, 12, 13, or 14 may all be in line as shown in FIGURE 1(a) or all be on the same side of the grid as shown in FIGURE 2(a), but it is preferred to form them on alternate sides of the grid as shown in FIGURES 3(a) and 4(a). Slight misalignment of the loops is easily accommodated by bending the grid elements slightly to bring them into alignment with the loops. The misalignment appears greatly exaggerated on the drawings because they are not to scale.

It is to be understood that in the manufacture of the units of this invention it may be desirable to combine the operation of twisting, welding, or otherwise rigidly fastening the horizontal and vertical wires together at their intersections with the loop-forming operation. Alternatively the loops may be formed from a separate piece of wire attached as by twisting, welding, etc. which piece of wire may also be the means for joining the grid wires at their intersections, whereby formation of the loop and union of the grid wires are accomplished by a single manufacturing operation.

It is apparent that in each of the embodiments of the invention as shown in FIGURES 1, 2, 3, and 4, the loops 10, 11, 12, 13, and 14 lie in the region of the grid opposite to that from which the protruding legs 9 extend, which area is bounded by the two uppermost horizontal elements 2(a) and 2(b) and the vertical boundary elements 1(a) and 1(e). Furthermore in each of the embodiments the axes of the loops are parallel to the protruding legs 9, and the axes of the loops are spaced the same as the horizontal spacing of the vertical elements 1(a), 1(b), 1(c), 1(d) and 1(e) which form the legs. In each of the embodiments of FIGURES 1, 2, 3 and 4 the protruding length of the legs 9 is not less than the distance 4 between the uppermost two horizontal elements 2(a) and 2(b) so that the legs 9 will reach through two vertically aligned loops when a vertical assembly is made.

In assembling the units of this invention for horizontal extension, adjacent units of FIGURE 1 may be simply tied together, i.e. the wire 1(e) of one unit is tied to the wire 1(a) of the adjacent unit, these wires being contiguous. Tying is conveniently done with string, flexible wire, or the like as shown by 20 in FIGURE 1(b). In the case of the embodiments of FIGURES 2, 3, or 4, adjacent loops of contiguous wires 1(e) and 1(a) of adjacent units may also be joined as by tying. Preferably however, in the case of the embodiments of FIGURES 2, 3, or 4, the loops of wires 1(e) and 1(a) of adjacent units are keyed together as illustrated in FIGURES 2(c) and 3(b) by means of a common nail 17. In assembling the various embodiments of this invention for vertical extension, the protruding legs of the upper units are inserted in the loops 10, 11, 12, 13, or 14 of the next underlying unit as shown in FIGURES 1(b) and 2(b). In this manner any horizontal or vertical size or shape plant support is readily assembled. In the assembling process it is convenient to insert the legs of the lowermost units into the ground on location and then add the overlying units onto the lower units, inserting the legs of the upper units into appropriate loops of the lower units. In placing the units against a plant already grown to some size it is convenient to bring in the unit from the side at a slight outwardly and upwardly flaring angle, start the legs at the lower edge of the unit either into the ground or into the receptacles, i.e. loops, of the underlying unit, and then bring the unit into the proper vertical position. This procedure will compact the plant and avoid abrading the plant.

The embodiments of FIGURES 5, 6, and 7 employ a somewhat different type of receptacle although the receptacle performs the same function as the loops 10, 11, 12, 13, and 14 of FIGURES 1, 2, 3, and 4. In the embodiment of FIGURE 5 the vertical grid wires 1(a), 1(b), 1(c), 1(d) and 1(e) protrude at the bottom edge 7 to form legs 9 whose extension is substantially more than half the distance 4 between the two uppermost horizontal grid wires 2(a) and 2(b). On each of the vertical boundary wires 1(a) and 1(e) there is located between the two uppermost horizontal wires 2(a) and 2(b) a receptacle 16 which in FIGURE 5 is in the form of a hollow metal cylinder 16 loosely encircling the wire. The cylinder 16 is not fastened to the grid wire but merely encircles it. The length 17 of the cylinder 16 is substantially less than the length of the legs 9 and is usually less than one-half the distance 4 between the two uppermost horizontal wires 2(a) and 2(b). The inside diameter of the cylinder 16 is greater than two times and is preferably about three times the outside diameter of the vertical wires 1(a) and 1(e). When two units of FIGURE 5 are assembled laterally, the cylinders 16 of adjacent wires of the two units are positioned so that one lies above the other, but slightly displaced laterally, as indicated in FIGURE 5(b) and a common nail 17 is inserted through both cylinders 16. If an overlying unit is to be joined to the underlying units than a leg of the overlying unit serves to key together the two cylinders, thus locking the respective included elements 1(a) and 1(e) of the underlying units as illustrated at 25 in FIGURE 8. Overlying units are coupled together by inserting adjacent legs of the adjacent overlying units into a common cylinder 16 as illustrated at 26 in FIGURE 8.

The cylindrical receptacles 16 of FIGURE 5 may be formed of sheet metal of suitable stiffness rolled into cylindrical form. Alternatively a cylinder-like receptacle may be formed of a coil of at least several loops of wire wound into a generally helical form as illustrated by 18 in FIGURE 6 or 28 in FIGURE 9. Each helical coil 18 (or 28) encircles an element of the grid. The coil 18 or 28 is made of wire preferably having a spring temper so that the coil is not easily deformed. The inside diameter of the coil 18 or 28 is greater than two times and is preferably about three times the outside diameter of the vertical grid elements 1(a) and 1(e) and the length 19 of the coil is substantially less than the length of the legs 9 and is usually less than one-half the distance 4 between the two uppermost horizontal elements 2(a) and 2(b). In assembly, the coil 18 or 28 serves the same purpose and functions in the same manner as the cylinder 16 illustrated in FIGURES 5 and 8. The coil 18 shown in FIGURE 6 is in the form of an open helix. The top and bottom ends of the helix may be provided with circular ends encircling the vertical element but this is not essential. The same purpose can be achieved with a tightly wound helical coil. The open helix is preferred because it is easier to manufacture and requires less wire. It is apparent that the individual turns of the coil need not be equally spaced, and the helix may have one or two almost circular turns at the top and bottom of each coil as illustrated in FIGURE 6.

FIGURE 6(b) illustrates how the units are coupled together by means of a common nail 17 inserted through two helical coils 18. Alternatively, by employing a flexible helix 18 or one whose pitch is sufficiently open, the helix 18 may be rotated onto the vertical wire of a contiguous unit by rotating the helix over the grid element turn by turn in a manner similar to that commonly employed to put a key on a helical key ring. It is apparent, however, that this procedure is more time consuming than the simple insertion of a common nail into the helixes as illustrated in FIGURE 6(b).

The helical coils 18 of FIGURE 6 may alternatively be of the form illustrated by 28 in FIGURE 9. One end of the helix 28, preferably the upper end, is provided with an appendage made by extending the helix wire outwardly as shown at 29 and bending the wire into the shape of a hook. The hook may, for example, be a hook-like downward extension 30, or alternatively may be formed as an upward extension (not shown) or by a hook-like recurvate horizontal extension (not shown). In FIGURES 9 and 9(a) the hook-like appendage is illustrated as a downward extension 30 that is substantially parallel to the axis of the helix and is spaced from the outside of the helix a distance greater than the diameter of the wire of which the helix is made. It is to be understood that the helical coils 28 of FIGURE 9 will link a vertical grid element in the same manner as coils 18 of FIGURE 6 or cylinders 16 of FIGURE 5. The hook-like extension 30 is advantageous when laterally coupling the uppermost units of an assembly as shown in FIGURE 9(a). Whereas FIGURE 8 illustrates an assembly of a number of modular units of FIGURE 5 in which a common nail 17 is employed to couple the upper edges of adjacent upper units, it is apparent that by employing helical coils of the form shown in FIGURE 9, the nail is eliminated and the extension 30 serves a similar purpose. The extension 30 of one helical coil is inserted into the adjacent receptacle thus coupling their respective units together as illustrated in FIGURE 9(a). An upward extending hook may be used in a similar manner, and a horizontal hook will catch the adjacent grid element itself rather than the receptacle of the adjacent grid element. On the other hand when legs are used to couple units as illustrated at 25 and 26 in FIGURE 8, the hook or extension 30 is simply not used. While the extension 30 is illustrated on a helical coil, it is apparent that a similarly shaped extension may be fastened, e.g. welded, on the outside of the cylinders 16 of FIGURE 5 to serve the same purpose.

The cylindrical receptacles 16 or the helical receptacles 18 or 28 encircling the elements 1(a) and 1(e) in the embodiments of FIGURES 5 and 6 are employed in laterally joining the grids in the manner indicated above. For the purpose of adding units in a vertical direction it is convenient to also have such a receptacle of either type 16, 18, or 28 shown in FIGURES 5, 6, 8, and 9 on the middle element 1(c) of the grid or on any other elements as desired. The receptacles on the intermediate element as 1(c) are similar in dimensions to the receptacles on the elements 1(a) and 1(e). The receptacle on the intermediate element is employed in making a vertical extension as shown in FIGURE 8, and also to laterally assemble the edge of one grid to an intermediate element of another grid to make a T joint (not shown), this being advantageous for producing square, T, H, X, or other shaped arrangements of the grids.

In a still further embodiment of this invention illustrated in FIGURE 7, the receptacles are in the form of helical coils 21 and 22 whose length is substantially the same as the length of the legs 9 and may have a length substantially the same as the distance 4 between horizontal elements 2(a) and 2(b). The helical coils 21 and 22 are either rigidly fastened to the elements 1(a) and 1(e) as shown in FIGURE 7, or they may loosely encircle the elements 1(a) and 1(e). In the embodiment of FIGURE 7 the helixes 21 and 22 extend the entire distance between the two uppermost horizontal elements 2(a) and 2(b) and in this embodiment the helixes 21 and 22 located at opposite edges of the unit must be wound in opposite hand and have the same pitch. For example the helix 21 may be a right-hand helix and the helix 22 at the opposite edge of the grid must then be a left-hand helix. For lateral assembly one such right-hand helix 21 will slip partly into one such left-hand helix 22 and a common nail 17 is inserted through the central hole of both helixes to lock them together as shown in FIGURE 7(b). The helixes 21 and 22 will not slip into each other if they are of the same hand or differ substantially in pitch. In making a vertical assembly one or more of the legs of the overlying unit are inserted through the intermeshed helixes 21 and 22 to lock the units together. Any of the other vertical wires such as 1(c) may also have helix 23 and htese must also be of the same pitch as helixes 21 and 22, and may be of either hand. However, for convenience in assembling T-shaped arrangements the intermediate helixes 23 may be different handed in different units. It is apparent that the helixes 21–23 may be provided with a horizontal or a downwardly extending hook-like appendage 30 previously described.

It is apparent that in assembling units having helixes 18 or 28, the helixes are assembled end to end and therefore the helixes may be either right-handed or left-handed since they need not mesh. However, in the embodiment illustrated in FIGURE 7, the helixes 21, 22, and 23 overlap and in this event the helixes 21 and 22 on the opposite edge elements 1(a) and 1(e) must be of opposite hand in order for the helixes to mesh and thereby permit the insertion of the locking member, i.e. either a common nail 17 or the legs 9 of the overlying units of an assembly.

FIGURE 8 illustrates how the modular support of this invention may be employed to form a plant support in the shape of a circular cylinder. For clarity of illustration the modular units of FIGURE 8 are shown with only three horizontal elements and all those receptacles hidden in the back of the figure are not indicated. The receptacles shown are those of FIGURE 5 but this is by way of example only and any of the embodiments of FIGURES 1 to 9 may be similarly assembled. Prior to making the assembly, the modular units are bent into the shape of a partial cylinder subtending the desired angle. The legs of the lower units are first stuck into the ground. Legs of the superpositioned units are then inserted into appropriate receptacles, (illustrated in FIGURE 8 as cylinders 16), and this locks the contiguous edges of the lower units together and at the same time supports the upper units. The contiguous edges of the uppermost units are locked by inserting a common nail 17 as previously described and shown in FIGURES 2(c), 3(b), 5(b), 6(b), and 7(b), and if the helical coils of FIGURE 9 are employed the arrangement shown in FIGURE 9(a) is used. While FIGURE 8 illustrates the embodiment of FIGURE 5 employing cylinders 16, this is by way of example only, and any of the embodiments of this invention may be similarly used employing receptacles in the form of loops 10, 11, 12, 13, 14, or helixes 18, 21–23, or 28. It is apparent that in a manner similar to that shown in FIGURE 8, prismatic, T-shaped, H-shaped, zigzag, serpentine, and other forms may be produced as desired and may be built up to any desired height.

Whereas we have described specific embodiments of our invention, it is apparent that variations will occur to those skilled in the art. Our invention is characterized in having an open-mesh grid with interconnected elements, legs extending from one edge of the grid, and receptacles adapted to accommodate said legs associated with elements of said grid in a region of the grid located at the edge of the grid opposite to that from which the legs protrude.

Whereas we have described our invention as embodying a rectangular grid having vertical and horizontal elements, it is apparent that the grid may comprise other geometric figures such as diamond-shaped, hexagon-shaped, interlocking or tangent circles, ovals, triangles, etc.

While this invention is primarily directed to a plant support, it may also be used to support a paper, fabric, or plastic canopy for protecting the plant against frost, wind, and precipitation.

What we claim as our invention is:

1. A modular plant support unit comprising an open-mesh grid having rigidly interconnected elements, a plurality of parallel legs protruding from a boundary edge of said grid, a plurality of open receptacles connected with elements of said grid in a region thereof conterminous with the boundary edge of said grid opposite to that from which said legs protrude, and said receptacles having a central opening whose axis is parallel to said legs and whose diameter is greater than the diameter of said legs.

2. A modular plant support unit comprising an open-mesh grid having rigidly interconnected elements, a plurality of parallel legs protruding from a boundary edge of said grid, a plurality of open receptacles connected with elements of said grid in a region thereof conterminous with the boundary edge of said grid opposite to that from which said legs protrude, and said receptacles having a central opening whose axis is parallel to said legs and whose diameter is at least two times the diameter of said legs.

3. A modular plant support unit comprising an open-mesh grid having horizontal and vertical rigidly interconnected elements, a plurality of parallel legs protruding vertically downward from the lower edge of said open grid, a plurality of receptacles respectively connected with horizontal elements of said grid in a region thereof conterminous with the upper boundary edge of said grid, said region extending the width of said grid and having a vertical dimension less than the length of said legs, and said receptacles having a central opening whose axis is vertical and whose diameter is at least two times the diameter of said legs.

4. A modular plant support unit comprising an open-mesh grid having horizontal and vertical rigidly interconnected elements, a plurality of parallel legs protruding vertically downward from the lower edge of said grid, a plurality of open receptacles respectively connected with vertical elements of said grid in a region thereof conterminous with the upper boundary edge of said grid, said region extending the width of said grid and having a vertical dimension less than the length of said legs, and said receptacles having a central opening whose axis is vertical and whose diameter is at least two times the diameter of said legs.

5. A modular plant support unit comprising an open-mesh grid having horizontal and vertical rigidly interconnected elements, a plurality of said vertical elements protruding from the lower boundary of said grid a distance greater than the vertical spacing of the uppermost two horizontal elements of said grid, a plurality of open receptacles connected with elements of said grid in a region thereof bounded by said uppermost two horizontal elements, said receptacles having a central opening whose axis is vertical and whose diameter is at least two times the diameter of said vertical elements.

6. A modular plant support unit comprising an open-mesh grid having horizontal and vertical rigidly interconnected elements, a plurality of parallel legs protruding vertically downward from the lower edge of said grid a distance greater than the distance between the two uppermost horizontal elements of said grid, a plurality of loops respectively connected with each of the two uppermost horizontal elements of said grid, said loops having a central opening whose axis is vertical and whose diameter is greater than the diameter of said legs, and at least two of said loops being in vertical alignment.

7. A modular plant support unit comprising an open-mesh grid having horizontal and vertical rigidly interconnected elements, a plurality of said vertical elements protruding vertically downward to form legs extending from the lower edge of said grid a distance greater than the vertical spacing of the uppermost two horizontal elements of said grid, a plurality of loops respectively connected with vertical elements of said grid in a region thereof conterminous with the upper boundary of said grid, said region extending the horizontal width of said grid and having a vertical extent less than the length of said legs, and said loops having a central opening whose axis is vertical and whose diameter is greater than the diameter of said legs.

8. A modular plant support unit comprising an open-mesh grid having horizontal and vertical rigidly interconnected elements, a plurality of said vertical elements protruding vertically downward to form legs extending from the lower edge of said grid a distance greater than the distance between the uppermost two horizontal elements of said grid, a plurality of loops respectively connected with vertical elements of said grid in a region thereof between the two uppermost horizontal elements of said grid, said loops having a central opening whose axis is vertical and whose diameter is greater than the diameter of said legs.

9. A modular plant support unit comprising an open-mesh grid having horizontal and vertical rigidly interconnected elements, a plurality of said vertical elements protruding vertically downward to form legs extending from the lower edge of said grid a distance greater than half the vertical spacing of the uppermost two horizontal elements of said grid, a plurality of open receptacles respectively connected with vertical elements of said grid in a region thereof conterminous with the upper boundary edge of said grid, said receptacle comprising a helical coil linking a vertical element in said region, said helical coil having a central opening whose diameter is greater than two times the diameter of said legs, and said helical coil having a length less than the length of said legs.

10. A modular plant support unit comprising an open-mesh grid having horizontal and vertical rigidly interconnected elements, a plurality of said vertical elements protruding vertically downward to form legs extending from the lower edge of said grid a distance greater than half the vertical spacing of the uppermost two horizontal elements of said grid, a plurality of receptacles respectively connected with vertical elements of said grid in a region thereof conterminous with the upper boundary edge of said grid, said receptacle comprising a hollow cylinder encircling a vertical element in said region, said cylinder having a central bore whose diameter is at least two times the diameter of said legs, and said cylinder having a length less than the length of said legs.

11. A modular plant support unit comprising an open-mesh grid having horizontal and vertical rigidly interconnected elements, a plurality of said vertical elements protruding vertically downward to form legs extending from the lower edge of said grid a distance greater than half the vertical spacing of the uppermost two horizontal elements of said grid, a plurality of receptacles respectively connected with vertical elements of said grid in a region thereof conterminous with the upper boundary edge of said grid, said receptacle comprising a helical coil linking a vertical element in said region, said helical coil having a central opening whose diameter is greater than two times the diameter of said legs, said helical coil having a length less than the length of said legs, and said helical coil terminating at one of its extremities with a hook-like extension external to said helical coil.

12. A modular plant support unit comprising an open-mesh grid having horizontal and vertical rigidly interconnected elements, a plurality of said vertical elements protruding vertically downward to form legs extending from the lower edge of said grid, a plurality of receptacles respectively connected with vertical elements of said grid in a region thereof conterminous with the upper boundary edge of said grid, said receptacle comprising a hollow member of generally cylindrical shape linking a vertical element of said grid in said region thereof, said member having a central opening whose diameter is greater than two times the diameter of said legs, and a hook-like appendage external to said receptacle fastened thereto.

13. A plant support assembly comprising a plurality of edgewise superposed and coupled modular units, said modular unit comprising an open mesh grid of rigidly interconnected elements, said unit having a plurality of legs along the bottom edge thereof and a plurality of receptacles proximate the upper edge thereof, lower units of said assembly being coupled by a leg of an overlying unit penetrating receptacles of adjacent lower units, and overlying units of said assembly being coupled by legs of said overlying units penetrating a common receptacle of a lower unit.

14. A plant support assembly comprising an array of edgewise coupled modular units, said array having horizontal and vertical extension, said modular unit comprising an open mesh grid of rigidly interconnected elements, said modular unit having a plurality of legs along the bottom edge thereof and a plurality of receptacles proximate the top edge thereof, adjacent underlying units of said assembly being coupled by adjacent receptacles of said underlying units penetrated by a common leg of an overlying unit, and adjacent overlying units of said assembly being coupled by adjacent legs of said overlying units penetrating a common receptacle of an underlying unit.

References Cited in the file of this patent

UNITED STATES PATENTS

| | | |
|---|---|---|
| 905,983 | Brown | Dec. 8, 1908 |
| 932,355 | Thrasher | Aug. 24, 1909 |
| 1,560,404 | Brown | Nov. 3, 1925 |
| 1,655,764 | Gehrts | Jan. 10, 1928 |
| 2,763,096 | Roger | Sept. 18, 1956 |

FOREIGN PATENTS

| | | |
|---|---|---|
| 512,601 | Germany | Nov. 15, 1930 |
| 120,503 | Sweden | Dec. 23, 1947 |